United States Patent [19]

Hoppe et al.

[11] Patent Number: 5,301,011

[45] Date of Patent: Apr. 5, 1994

[54] METHOD OF AND APPARATUS FOR ASCERTAINING THE DIAMETERS OF ROD-SHAPED ARTICLES

[75] Inventors: Reinhard Hoppe, Marschacht; Rolf Lindemann, Glinde, both of Fed. Rep. of Germany

[73] Assignee: Korber AG, Hamburg, Fed. Rep. of Germany

[21] Appl. No.: 857,733

[22] Filed: Mar. 26, 1992

[30] Foreign Application Priority Data

Apr. 4, 1991 [DE] Fed. Rep. of Germany ....... 4110855
Jul. 11, 1991 [DE] Fed. Rep. of Germany ....... 4122936

[51] Int. Cl.$^5$ ............................................. G01B 11/10
[52] U.S. Cl. .................... 356/385; 209/536; 209/586; 250/560
[58] Field of Search .............. 356/384, 385, 386, 387; 209/536, 586; 250/560, 223 R

[56] References Cited

U.S. PATENT DOCUMENTS

| | | | |
|---|---|---|---|
| 3,583,546 | 6/1971 | Koop | 198/33 |
| 3,974,007 | 8/1976 | Greve | 156/64 |
| 4,011,950 | 3/1977 | McLoughlin | 209/536 |
| 4,339,026 | 7/1982 | Bäse | 198/347 |
| 4,901,860 | 2/1990 | Wahle | 209/535 |
| 5,121,635 | 6/1992 | Coffelt et al. | 356/385 |

*Primary Examiner*—F. L. Evans
*Attorney, Agent, or Firm*—Darby & Darby

[57] ABSTRACT

The diameters of rod-shaped articles of the tobacco processing industry are ascertained while the articles are transported past a measuring station in the flutes of a drum-shaped conveyor moving along a range finder which measures the distance of each article of a series of articles from a reference point and transmits appropriate signals to an evaluating circuit wherein the diameters of successive articles are determined on the basis of comparison with a fixed reference distance of the bottoms of the flutes from the reference point. The beam of radiation which is emitted by the radiation source of the range finder is reflected by successive articles, and the intensity of reflected radiation is used to generate second signals which are processed into signals denoting a second diameter of each article. A third diameter of each article can be ascertained downstream of the range finder by an optoelectronic detector.

38 Claims, 3 Drawing Sheets

METHOD OF AND APPARATUS FOR ASCERTAINING THE DIAMETERS OF ROD-SHAPED ARTICLES

BACKGROUND OF THE INVENTION

The invention relates to improvements in methods and apparatus for ascertaining the diameters of rod-shaped articles, particularly rod-shaped articles of the tobacco processing industry. Such articles include tobacco-containing rods, rods of filter material for tobacco smoke, sections of filter rods, sections of tobacco-containing rods as well as filter cigarettes, cigarillos, cigars and cheroots.

It is already known to ascertain the diameters of rod-shaped articles by placing the articles onto a support which transports the articles through a measuring station wherein the diameter of each article is ascertained by resorting to a beam of light or other suitable radiation.

The diameter constitutes an important parameter of each rod-shaped article of the tobacco processing industry. The same holds true for the shape of each rod-shaped article, i.e., it is important that the diameter match or closely approach a selected optimum diameter and that the shape of each article at least approximate a desired shape. For example, many plain or filter cigarettes are or should be round. On the other hand, certain manufacturers prefer to turn out rod-shaped articles of the tobacco processing industry which have a slightly oval shape. In either event, it is desirable and advantageous to monitor the rod-shaped articles in order to rapidly detect deviations from the desired or optimal diameter and/or from the desired or optimal cross-sectional outline.

In accordance with a presently preferred procedure, the diameters of successive rod-shaped articles of the tobacco processing industry (hereinafter generically referred to as cigarettes or filter cigarettes but intended to embrace also filter rod sections, cigars and others) are ascertained by transporting successive cigarettes past a photoelectronic detector wherein a beam of radiation issuing from a suitable source and directed upon an optoelectronic signal generating transducer crosses the path of successive cigarettes. The diameters of successive cigarettes are ascertained by determining the duration of transport of a cigarette across the beam of radiation and by taking into consideration the speed of transport of the cigarettes through the monitoring station. Thus, if the speed of advancement of cigarettes across the beam is fixed or constant, the duration of interval of interruption or interception of the beam by a cigarette is directly related to the diameter of such cigarette.

A drawback of the just outlined procedure is that the results of measurement are misleading if the cigarette which intercepts the beam for a certain interval of time is out of round or is otherwise deformed. Attempts to overcome such problem include the utilization of two photoelectronic detectors with crossing beams of optical radiation. Thus, each detector ascertains a different diameter of each article and the difference (if any) between the thus determined different diameters of an article is then indicative of the degree and/or nature of deformation of the respective article. Reference may be had, for example, to U.S. Pat. No. 4,011,950 granted Mar. 15, 1977 to McLoughlin et al. for "Cigarette Monitoring Apparatus".

The proposal of McLoughlin et al. also exhibits certain drawbacks, perhaps primarily because the apparatus which is disclosed in this patent does not permit the determination of two diameters which extend at right angles to each other. As a rule, diameter measurements with two photoelectronic detectors are carried out in such a way that the two ascertained diameters make an angle of less than 90°. This renders it necessary to employ rather complex signal evaluating systems or to disregard certain errors which develop as a result of the failure to determine two diameters which are exactly normal to each other. On the other hand, it is highly desirable and advantageous to ascertain the diameters of cigarettes with a very high degree of accuracy, for example, when the cigarettes and filter rod sections are fed into a tipping machine wherein each filter rod section is united with one or more plain cigarettes to form therewith a filter cigarette of unit length or multiple unit length.

OBJECTS OF THE INVENTION

An object of the invention is to provide a novel and improved method of ascertaining the diameters of plain cigarettes, filter rod sections, filter cigarettes and/or other rod-shaped articles of the tobacco processing industry with a higher degree of accuracy than in accordance with heretofore known methods.

Another object of the invention is to provide a method which renders it possible to ascertain the diameters of rod-shaped articles of the tobacco processing industry without resorting to any photo-electronic detectors or without resorting exclusively to photoelectronic detectors.

A further object of the invention is to provide a method which renders it possible to accurately ascertain the diameters of rod-shaped articles of the tobacco processing industry in a production line and at the speed at which such articles are produced and/or processed in modern high-speed production lines.

An additional object of the invention is to provide a novel and improved method of repeatedly ascertaining two or more different diameters of each of a short or long series of successive rod-shaped articles of the tobacco processing industry.

Still another object of the invention is to provide a method which renders it possible to ascertain for each rod-shaped article two diameters which are exactly normal to each other.

A further object of the invention is to provide a novel and improved technique for processing information which is obtained as a result of determination of two or more different diameters of each of a series of rapidly advancing rod-shaped articles, particularly rod-shaped articles of the tobacco processing industry.

An additional object of the invention is to provide a novel and improved method of ascertaining the diameters of filter rod sections in a filter tipping machine for cigarettes or the like.

Another object of the invention is to provide a novel and improved method of ascertaining the shapes of consecutively produced or processed rod-shaped articles in a production line for filter cigarettes or the like.

Still another object of the invention is to provide a novel and improved apparatus for the practice of the above outlined method.

A further object of the invention is to provide an apparatus which can be installed in existing machines and/or production lines for rod-shaped articles of the tobacco processing industry.

An additional object of the invention is to provide the apparatus with novel and improved means for determining the diameters of rod-shaped articles without resorting to photoelectronic detectors.

Another object of the invention is to provide the above outlined apparatus with novel and improved means for processing signals which are obtained as a result of one or more diameter measurements for each of a short or long series of rod-shaped articles.

Still another object of the invention is to provide the apparatus with novel and improved means for simultaneously ascertaining several different diameters of each of a short or long series of rod-shaped articles of the tobacco processing industry at one and the same monitoring or measuring station.

A further object of the invention is to provide the apparatus with novel and improved means for simultaneously or consecutively determining, for each rod-shaped article, two diameters which extend exactly at right angles to each other.

Another object of the invention is to provide a machine, such as a filter tipping machine, which embodies an apparatus of the above outlined character.

An additional object of the invention is to provide a novel and improved apparatus for ascertaining the diameters of filter rod sections in a filter tipping machine for the production of filter cigarettes, cigars, cigarillos or cheroots.

Still another object of the invention is to provide a production line which embodies one or more above outlined apparatus for ascertaining the diameters of rod-shaped articles of the tobacco processing industry.

A further object of the invention is to provide an apparatus which can immediately indicate the shape, or deviations from desired shape, of each of a long or short series of rod-shaped articles.

SUMMARY OF THE INVENTION

One feature of the invention resides in the provision of a method of ascertaining the diameters of normally substantially round rod-shaped articles of the tobacco processing industry. The improved method comprises the steps of advancing a succession of articles (e.g., a row of equidistant parallel articles) in a predetermined direction along a predetermined path and past a reference point which is adjacent a predetermined portion of the path and is spaced apart from each successive article advancing along such portion of the path, optically measuring the distance of each successive article in the predetermined portion of the path from the reference point and generating first signals which denote the respective measured distances, and converting each first signal into a second signal denoting one diameter of the respective article.

The advancing step can comprise depositing the articles of the aforementioned succession onto a mobile support (such as into the axially parallel peripheral flutes of a rotary drum-shaped conveyor) and moving the support past and at a predetermined distance from the reference point.

The method can further comprise the step of memorizing a reference signal denoting a reference distance, and the converting step of such method can comprise relating each first signal to the reference signal. The reference distance can constitute the aforementioned predetermined distance (of the support from the reference point).

The advancing step can include transporting each article of the succession along the predetermined portion of the path substantially at right angles to he central longitudinal axis of the respective rod-shaped article.

The measuring step can include repeatedly measuring the distance of each article in the predetermined portion of the path from the reference point to form for each article a set of consecutive first signals having different magnitudes and including a representative first signal of extreme (maximum or minimum) magnitude. The converting step of such method can include converting the representative first signals of extreme magnitude into the respective second signals. The just discussed measuring step can further comprise processing each set of consecutive first signals into an array of first signals, and selecting the representative first signals from the respective arrays.

The method can further comprise the step of averaging second signals pertaining to pluralities of successively measured articles to form corrected signals denoting the average diameters of the respective pluralities of articles.

In accordance with a presently preferred embodiment of the method, the measuring step includes directing at least one beam of radiation (e.g., visible, infrared or other radiation) from a suitable source into the predetermined portion of the path so that the at least one beam impinges upon and is reflected by successive articles advancing along the predetermined portion of the path whereby the intensity of the reflected at least one beam is indicative of a second diameter of the beam-reflecting article. Such method can further comprise the steps of monitoring the intensity of the reflected at least one beam upon impingement on successive articles and generating third signals denoting the respective intensities, and processing the third signals into fourth signals which denote the second diameters of the respective articles. The monitoring step can further comprise determining the duration of impingement of at least one beam upon successive articles in the predetermined portion of the path and generating fifth signals which denote the respective durations. The processing step then includes transforming the third signals and the corresponding fifth signals into the respective fourth signals. The intensity of the at least one beam varies at a first instant of entry of each article into and at a second instant of advancement of each article beyond the predetermined portion of the path, and the determining step can include measuring for each article the length of the interval between the respective first and second instants. Such method can further comprise the step of forming corrected signals, and the forming step can include averaging each second signal and the respective fourth signal, preferably in accordance with the equation $D=(D_1 \times D_2)^{\frac{1}{2}}$, wherein D is a corrected signal, $D_1$ is the corresponding second signal and $D_2$ is the respective fourth signal.

In accordance with another presently preferred embodiment, the method further comprises the steps of monitoring the articles of the aforementioned succession in a second portion of the path, and generating additional signals denoting additional diameters of the monitored articles. The second portion of the path can be located downstream of the predetermined portion. The monitoring step can include directing at least one beam of radiation from a suitable source into the second portion of the path so that the at least one beam impinges upon and is interrupted by successive articles advancing along the second portion of the path for intervals of time which are indicative of the additional diameters of the respective articles, measuring the duration of each interval, and generating further signals which denote the measured durations of the intervals. The signal generating step of such method includes processing the further signals into the additional signals. This method can further comprise the step of forming corrected signals including averaging each second signal with the respective additional signal, preferably in accordance with the equation $D=(D_1 \times D_2)^{\frac{1}{2}}$, wherein D is a corrected signal, $D_1$ is the corresponding second signal and $D_2$ is the respective additional signal.

Another feature of the present invention resides in the provision of an apparatus for ascertaining the diameters of normally substantially round rod-shaped articles of the tobacco processing industry. The apparatus comprises means for advancing a succession of rod-shaped articles in a predetermined direction along a predetermined path and past a reference point which is adjacent a predetermined portion of the path and is spaced apart from each successive article advancing along the predetermined portion of the path, means for optically measuring the distance of each successive article in the predetermined portion of the path from the reference point and for generating first signals which denote the respective measured distances, and means for converting the first signals into second signals each of which denotes one diameter of the respective article.

The converting means can comprise a signal evaluating circuit.

The measuring means preferably comprises a source of radiation and means for directing radiation from the source into the predetermined portion of the path.

The advancing means can comprise a mobile support for the articles of the aforementioned succession, and means for moving the support past and at a predetermined distance from the reference point.

The converting means can further comprise a memory for a reference signal which denotes a reference distance, and means for relating each of the first signals to the reference signal. The reference distance can but need not always constitute or equal the afore-mentioned predetermined distance. The means for relating each first signal to the reference signal can include means for determining the difference between the reference signal and each first signal.

In accordance with a presently preferred embodiment, the measuring means can comprise a range finder which determines the distance of successive articles from the reference point by resorting to triangulation. Such range finder can comprise the aforementioned source of radiation and means for directing at least one beam of radiation from the source into the predetermined portion of the path so that the at least one beam impinges upon and is intercepted and reflected by successive articles advancing along the predetermined portion of the path whereby the intensity of the reflected at least one beam is indicative of a second diameter of the beam-reflecting article. Such measuring means preferably further comprises means for monitoring the intensity of the reflected at least one beam upon impingement on successive articles and for generating third signals which denote the respective intensities. The converting means of such apparatus includes means for processing the third signals into fourth signals which denote the second diameters of the respective articles. The monitoring means can include means for determining the duration of impingement of the at least one beam upon successive articles in the predetermined portion of the path and for generating fifth signals which denote the respective durations. The processing means then includes means for processing the fifth signals and the corresponding third signals into the respective fourth signals. The monitoring means of the just outlined apparatus can comprise means for repeatedly monitoring the intensity of the at least one beam during advancement of an article along the predetermined portion of the path and for generating for each article a set of consecutive third signals. The intensity of the reflected at least one beam normally varies at a first instant of entry of each article into and at a second instant of advancement of each article beyond the predetermined portion of the path. The determining means can include means for measuring for each article the length of the interval between the respective first and second instants.

The converting means can further comprise means for forming corrected signals from the second signals and the respective fourth signals. Such forming means can comprise means for averaging the second signals and the respective fourth signals in accordance with the equation $D=(D_1 \times D_2)^{\frac{1}{2}}$, wherein D is a corrected signal, $D_1$ is the corresponding second signal, and $D_2$ is the respective fourth signal.

The at least one beam is reflected (a) by an article in the predetermined portion of the path or (b) by the support of the advancing means in the absence of an article in the predetermined portion of the path. It is preferred to provide the support with a radiation absorbing surface which confronts the radiation source at the predetermined portion of the path; this further enhances the contrast between radiation which is reflected by the support and radiation which is reflected by an article in the predetermined portion of the path.

The converting means can include means for averaging second signals pertaining to pluralities of successively measured articles and for forming corrected signals denoting the average diameters of the respective pluralities of articles.

The apparatus can further comprise means for monitoring the articles in a second portion of the path (such second portion may but need not be located downstream of the predetermined portion) and for generating additional signals which denote additional diameters of monitored articles. The monitoring means at the second portion of the path can comprise means for directing at least one beam of suitable radiation from a source into the second portion of the path so that the at least one beam impinges upon and is intercepted by successive articles advancing along the second portion of the path for intervals of time which are indicative of the diameters of the respective articles, means for measuring the duration of each such interval, and means for generating further signals denoting the measured duration of the intervals. The signal generating means of such apparatus can comprise means for processing the further signals into the additional signals. The converting means of such apparatus can further comprise means for forming corrected signals from the second signals and the respective additional signals. The forming means can comprise means for averaging the second signals and the respective additional signals in accordance with the equation $D=(D_1 \times D_2)^{\frac{1}{2}}$, wherein D is a corrected signal, $D_1$ is the corresponding second signal, and $D_2$ is the respective additional signal.

The advancing means can comprise a conveyor (e.g., a rotary drum-shaped conveyor) which transports articles in the form of filter rod sections from a magazine of a filter tipping machine to means for uniting filter rod sections with tobacco rod sections.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
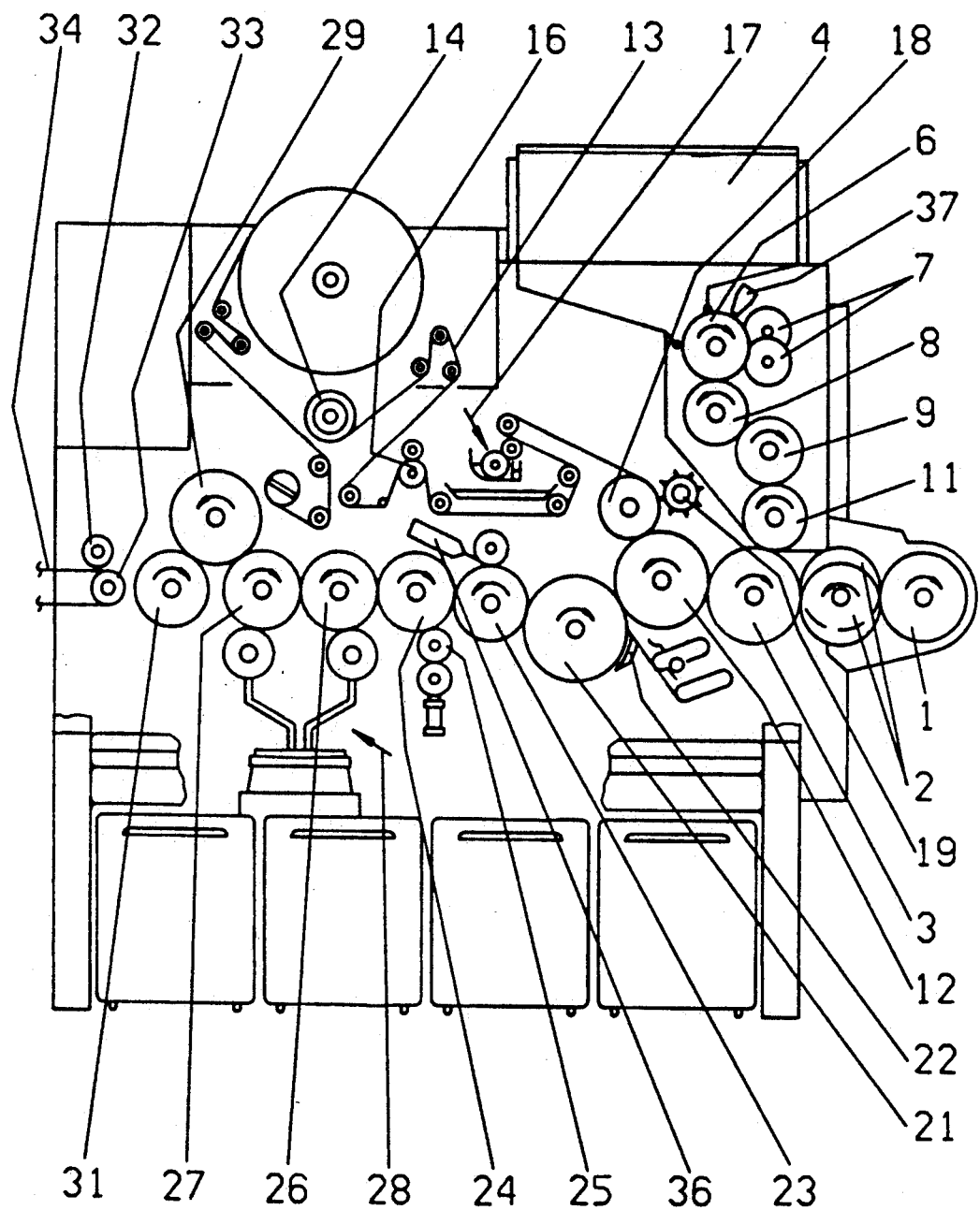
FIG. 1 is a schematic front elevational view of a filter tipping machine wherein the improved apparatus is utilized to determine the diameters of successive filter rod sections ahead of the location where the filter rod sections are united with plain cigarettes.

FIG. 1 shows certain parts of a filter tipping machine which is known as MAX and is made and distributed by the assignee of the present application. A similar filter tipping machine is shown and described in commonly owned U.S. Pat. No. 4,901,860 granted Feb. 20, 1990 to Wahle et al. for "Apparatus for testing and classifying cigarettes or the like", to which reference may be had if necessary. The illustrated filter tipping machine comprises a rotary drum-shaped conveyor 1 having axially parallel peripheral flutes each of which carries a plain cigarette of unit length. The plain cigarettes form two rows which are respectively adjacent the first and second axial ends of the conveyor 1; the evenly numbered flutes of the conveyor 1 carry the plain cigarettes of one row and the oddly numbered flutes of the conveyor 1 carry the other row. The conveyor 1 delivers the two rows of plain cigarettes into the axially parallel peripheral flutes of two rotary drum-shaped aligning conveyors 2 which transport the plain cigarettes of the respective rows at different speeds and/or through different distances so that each axially parallel peripheral flute of a rotary drum-shaped assembly conveyor 3 receives a pair of coaxial plain cigarettes which are spaced apart from each other a distance at least equal to the length of a filter plug or mouthpiece of double unit length.

The frame of the filter tipping machine of FIG. 1 carries a magazine 4 for a supply of parallel rod-shaped filter rod sections 41 (FIG. 2) of six times unit length. The outlet at the bottom of the magazine 4 admits discrete filter rod sections 41 into the axially parallel peripheral flutes of a rotary drum-shaped severing conveyor 6 serving to advance the filter rod sections past two axially and circumferentially staggered rotary disc-shaped knives 7 which subdivide each filter rod section 41 of six times unit length into three coaxial rod-shaped sections. Each such shorter section constitutes a filter mouthpiece or filter plug of double unit length. Successive groups of three filter plugs each are transferred into the axially parallel peripheral flutes of three discrete coaxial drums of a staggering conveyor 8 which moves the filter plugs of each group sideways relative to each other so that each discrete filter plug can be introduced into a separate axially parallel peripheral flute of a rotary drum-shaped shuffling conveyor 9. The latter cooperates with stationary cams or like devices (not specifically shown) which move some or all of the filter plugs in its flutes axially so that the thus shuffled filter plugs form a single file wherein each next-following filter plug is accurately aligned with the preceding filter plug. Successive filter plugs of such single file are introduced into successive axially parallel peripheral flutes of a rotary drum-shaped combined accelerating and inserting conveyor 11. The latter inserts successive filter plugs between pairs of plain cigarettes in the flutes of the assembly conveyor 3.

Thus, each flute of the conveyor 3 ultimately contains a group of three coaxial articles including a pair of plain cigarettes and a filter plug of double unit length between them. Such groups are transferred into successive axially parallel peripheral flutes of a rotary drum-shaped transfer conveyor 12. Prior to being transferred onto the conveyor 12, the groups of coaxial plain cigarettes and filter plugs are shortened or condensed, e.g., by advancing between two stationary cams which cause the inner ends of the plain cigarettes to move toward and to actually abut the respective ends of the coaxial filter plug.

The frame of the filter tipping machine of FIG. 1 carries an expiring bobbin or reel 14 constituting a source of supply of a web 13 of tipping paper (e.g., cigarette paper or imitation cork) which is drawn off the reel 14 by two advancing rolls 16 and one side of which is coated with a suitable adhesive during transport along a paster 17. The leader of the web 13 is attracted to the peripheral surface of a rotary suction drum 18 which cooperates with a rotary knife drum 19 to repeatedly sever the leader of the web 13 and to thus form a series of discrete uniting bands. One side of each uniting band is coated with adhesive, and successive uniting bands are applied to successive groups of coaxial rod-shaped plain cigarettes and filter plugs in the flutes of the transfer conveyor 12 in such a way that a properly transferred uniting band extends along the full length of the respective filter plug as well as along the adjacent inner end portions of the aligned plain cigarettes of unit length.

The conveyor 12 delivers successive groups (each of which carries a uniting band) into successive flutes of a rotary drum-shaped rolling conveyor 21 which cooperates with a stationary, mobile or adjustable rolling member 22 to convolute each uniting band around the respective filter plug as well as around the adjacent inner end portions of the aligned plain cigarettes of unit length. This converts successive groups and the respective uniting bands into filter cigarettes of double unit length wherein the convoluted uniting band sealingly surrounds the respective filter plug and secures such filter plug to the respective plain cigarettes of unit length.

Successive filter cigarettes of double unit length are transferred into the axially parallel peripheral flutes of a rotary drum-shaped drying conveyor 23 whereon the adhesive on the convoluted uniting bands sets before the filter cigarettes of double unit length are transferred into successive axially parallel peripheral flutes of a rotary drum-shaped severing conveyor 24. The latter cooperates with a rotary disc-shaped knife 25 which severs each filter cigarette of double unit length midway between its axial ends (i.e., midway across the convoluted uniting band and midway across the filter plug) to form pairs of coaxial filter cigarettes of unit length.

Successive pairs of thus obtained filter cigarettes of unit length are transferred into successive axially parallel peripheral flutes of a rotary drum-shaped conveyor 26 forming part of a so-called turn-around or inverting device 28 (reference may be had to commonly owned U.S. Pat. No. 3,583,546 granted Jun. 8, 1971 to Koop for "Apparatus for inverting cigarettes or the like"). The device 28 inverts one cigarette of each pair end-for-end and introduces the inverted cigarettes into alternate flutes of a further rotary drum-shaped conveyor 27 forming part of the turn-around device 28. The other flutes of the conveyor 27 receive non-inverted filter cigarettes of unit length directly from the conveyor 26 so that the conveyor 27 carries a single file of parallel cigarettes with the filter mouthpieces (i.e., halves of filter plugs) of all filter cigarettes facing in the same direction.

The conveyor 27 delivers successive filter cigarettes of unit length into successive axially parallel flutes of a rotary drum-shaped testing conveyor 29 which delivers satisfactory and defective filter cigarettes into successive axially parallel flutes of a rotary drum-shaped ejecting or expelling conveyor 31. The latter segregates (e.g., pneumatically) defective filter cigarettes from satisfactory filter cigarettes and delivers satisfactory filter cigarettes onto the upper reach of an endless take-off conveyor 34 having one or more belts or chains trained over two or more pulleys or sprocket wheels 33 (one shown in FIG. 1) and cooperating with a braking roller 32. The conveyor 34 delivers satisfactory filter cigarettes of unit length to storage, directly into the magazine of a packing machine or to another destination. The conveyor 1 forms part of a cigarette rod making machine (e.g., a machine known as PROTOS which is manufactured and distributed by the assignee of the present application).

The heretofore described parts of the filter tipping machine and cigarette rod making machine of FIG. 1 are known and by themselves form no part of the present invention.

The filter tipping machine of FIG. 1 further comprises a perforating apparatus 36 which normally operates with one or more laser beams and serves to provide the filter cigarettes of double unit length on the drying conveyor 23 with at least two annuli of perforations so that the filter mouthpiece (of unit length) of each filter cigarette of unit length is provided with at least one so-called ventilation zone for admission of atmospheric air into the column of tobacco smoke which is drawn by the smoker when the respective filter cigarette of double unit length is lighted. The perforating apparatus 36 can be installed in another section of the filter tipping machine, or the latter can be provided with two such apparatus, e.g., one adjacent each of the two rows of filter cigarettes of unit length which are formed on the severing conveyor 24 and advance toward and are united with each other into a single row on the conveyor 27 of the turn-around device 28.

In accordance with a feature of the invention, the filter tipping machine of FIG. 1 is combined with or embodies an apparatus for ascertaining the diameters of successive filter rod sections 41 of six times unit length, of plain cigarettes of unit length, of successive filter plugs of double unit length, and/or of successive mouthpieces of unit length. FIG. 1 shows that the apparatus serves to ascertain the diameters of rod-shaped articles 41 constituting filter rod sections of six times unit length. FIG. 1 merely shows an optical measuring instrument 37 which can be termed a range finder and includes means for ascertaining two different diameters of each article 41 at the location between the outlet of the magazine 4 for articles 41 and the first of the two rotary disc-shaped knives 7. The instrument 37 can be transferred to a location adjacent the conveyor 9 or 11 or 3 or 12 if the improved apparatus is to measure the diameters of filter mouthpieces of double unit length. It is presently preferred to install the measuring instrument 37 as close to the magazine 4 as possible in order to ensure that defective articles 41 can be detected in immediate proximity to the source of supply of such articles.

Figure 2:
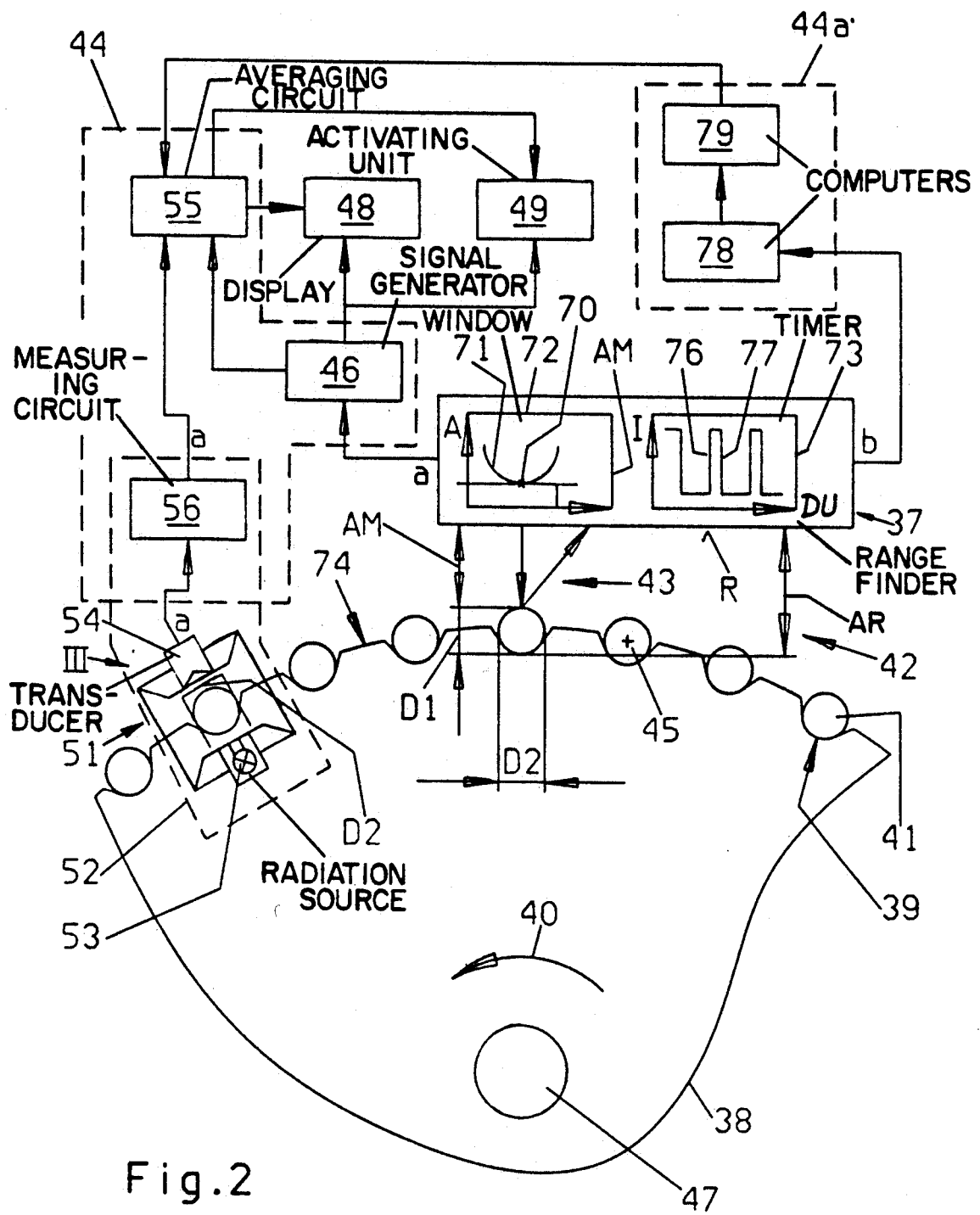
FIG. 2 is an enlarged view of a detail in the machine of FIG. 1 and a diagrammatic view of the improved apparatus.

The details of one presently preferred diameter ascertaining apparatus are shown in FIG. 2 wherein the rotary drum-shaped conveyor 38 corresponds to the severing conveyor 6 of FIG. 1. The conveyor 38 can be said to constitute a support and a means for advancing or transporting successive rod-shaped articles 41 along a predetermined path having a predetermined first portion (first measuring station) 42 adjacent the optical measuring instrument 37. The means for moving the support 38 along the predetermined portion or measuring station 42 comprises a shaft 47 which is driven by a suitable prime mover (not shown) in synchronism with many other rotary components of the filter tipping machine. The conveyor 38 has article receiving means here shown as axially parallel peripheral flutes 39 for portions of discrete articles 41, and the bottom portion or deepest portion of each such flute 39 is located at a predetermined (reference) distance AR from a reference point (indicated at R) which is defined or established by the instrument 37 when the nearest flute 39 is located exactly beneath the point R (as viewed in FIG. 2).

The instrument 37 contains or carries a radiation source (not specifically shown) which emits at least one beam 43 of suitable (visible, infrared or other) radiation so that the beam crosses the predetermined portion (measuring station 42) of the path for successive articles 41 and impinges upon and is reflected by an article 41 or by the peripheral surface 74 of the conveyor 38 in the absence of an article at the station 42. The peripheral surface 74 also includes the concave surfaces bounding the flutes 39. This surface can be dulled, coated with opaque material and/or otherwise treated so that its reflectivity is much less pronounced than that of the normally white or light colored tubular wrapper of an article 41.

The illustrated instrument 37 can be a commercially available range finder which triangulates the distances of the reference point R from an article 41 or from the bottom portion of a flute 39. For example, the instrument 37 can be of the type known as LC-ML-AT 30/3/30K which is made and distributed by the Firm Laser Components, D-8038 Gröbenzell, Federal Republic Germany. The instrument 37 determines the distance AM of the article 41 at the measuring station 42 from the reference point R. The (reference or predetermined) distance AR of the bottom portion of a flute 39 at the measuring station 42 from the reference point R is known and need not be ascertained again and again.

An evaluating circuit 44 which receives (first) signals from the output a of the instrument 37 includes a memory for a reference signal which denotes the distance AR. The simplest way of determining a first diameter $D_1$ of each article 41 is to deduct the measured distance AM from the reference distance AR because the difference between these distances equals the diameter $D_1$ (namely that diameter which extends exactly radially of the conveyor 38).

The evaluating circuit 44 includes a circuit 46 which generates (second) signals denoting the diameters $D_1$ of successively measured articles 41 which advance along the measuring station 42. To this end, the input of the signal generating circuit 46 is connected with the output a of the instrument 37.

The signal generating circuit 46 is preferably designed in such a way that it can average a set of successive first signals which appear at the output of the instrument 37 during advancement of an article 41 past the reference point R. The thus obtained averaged signal can be said to constitute a corrected signal denoting the diameter $D_1$ of an article at the measuring station 42. The output of the circuit 46 is connected to a display unit 48 which can display the second signals (i.e., the diameters $D_1$ of successive articles 41) on a screen. In addition to or in lieu of transmitting second signals to the display unit 48, the signal generating circuit 46 can transmit such signals to an actuating unit 49. For example, the actuating unit 49 can serve to actuate a barrier or gate which seals the outlet of the magazine 4 when the diameters $D_1$ of a selected number of successively measured articles 41 deviate from an optimum value to a preselected extent, i.e., when the measured diameters $D_1$ are outside of a range of acceptable diameters. Alternatively, the actuating unit 49 can be used to interrupt the delivery of articles 41 to the magazine 4 and/or to transmit appropriate correction signals to the machine which makes the articles 41.

The instrument 37 can be used for simultaneous monitoring of a second diameter $D_2$ of each article 41 arriving at the measuring station 42, i.e., into the predetermined portion of the path for the articles 41 in the flutes 39 of the conveyor 38. Thus, the beam 43 which issues from the radiation source of the instrument 37 is intercepted and reflected by an article 41 which is adjacent the reference point R, and the intensity I of such reflected beam is monitored by a timer 73 of the instrument 37 while the beam 43 impinges upon an article 41. The duration DU of such impingement is indicative of a second diameter $D_2$ which is tangential to the peripheral surface 74 at the reference point R and is thus normal to the diameter $D_1$. The intensity I of reflected beam 43 is measured along the ordinate and the duration DU of reflection of the beam 43 by successive articles 41 is measured along the abscissa in a coordinate system of the timer or duration measuring means 73. The curve in the coordinate system of FIG. 2 shows that the intensity I of reflected radiation increases abruptly at 76 during the instant of initial impingement of the beam 43 upon an article 41 at the measuring station 42 and decreases just as abruptly at 77, namely at the instant of advancement of the article 41 beyond the range of the beam 43. The length (DU) of the interval between the instants 76 and 77 is indicative of the diameter $D_2$ of the monitored article 41. A signal is transmitted by the output b of the instrument 37 during the interval between 76 and 77, and such signal is processed in a computer 78 forming part of a processing unit 44a which is part of or is connected to the evaluating circuit 44. The circuit 78 transforms the signal from the output b of the timer 73 into a (third) signal denoting the diameter $D_2$ of the monitored article 41.

As already mentioned above, the peripheral surface 74 of the conveyor 38 can be dulled or otherwise treated on purpose in order to enhance the contrast between the intensity I of the beam 43 which is reflected by the wrapper of an article 41 and the intensity I of the beam which is reflected by the peripheral surface 74. The external surface of the wrapper of an article 41 is normally or often white so that the intensity I of the beam 43 which is reflected by the wrappers of successive articles 41 at the measuring station 42 is much more pronounced than the intensity of radiation which is reflected by the surface 74. This is desirable and advantageous because the differences between the two intensities are clear cut and the intervals (DU) of reflection of the beam 43 by the wrappers of successive articles 41 can be measured with a high degree of accuracy.

It will be seen that the instrument 37 cooperates with the conveyor 38 to simultaneously determine two diameters $D_1$ and $D_2$ of successive articles 41, and that these diameters extend exactly at right angles to each other. This is desirable and advantageous because such diameters can be more readily evaluated in order to determine the exact cross-sectional outlines of the measured articles 41.

The computer 78 of the signal processing unit 44a transmits (third) signals to a further computer 79 which processes such signals into (fourth) signals each of which is indicative of the respective diameter $D_2$.

If the beam 43 which is emitted by the radiation source of the instrument 37 is not or cannot be used for monitoring of the second diameters $D_2$ of successive articles 41, such second diameters can be determined in a second portion (second measuring station 51) of the path for the articles 41. In FIG. 2, the second measuring station 51 is located downstream of the measuring station 42 where the instrument 37 is used to measure the first diameters $D_1$ of successive articles 41. The second measuring station 51 is indicated in FIG. 2 by broken lines because it will be used primarily or exclusively in lieu of the timer 73 and associated processing unit 44a. However, it is equally within the purview of the invention to provide the second measuring station 51 in addition to the timer 73 at the measuring station 42, for example, in order to test the accuracy of determination of the diameters $D_2$ with the beam 43 which is reflected by successive articles 41 advancing past the reference point R.

The monitoring instrumentalities at the second measuring station 51 include an optoelectronic detector 52 which monitors the articles 41 with at least one beam of radiation issuing from a suitable source 53. Such radiation is directed across the path of the articles 41 at the measuring station 51 and upon the radiation-sensitive surface or surfaces of an optoelectronic transducer 54. The duration of (additional) signal which is transmitted by the transducer 54 while the beam of radiation issuing from the source 53 is interrupted by an article 41 at the measuring station 51 is indicative of the diameter $D_2$ of such article. Again, the diameter $D_2$ which is determined by the detector 52 is normal to the diameter $D_1$ which is measured by the instrument 37 at the first measuring station 42. The output a of the transducer 54 transmits signals to a duration measuring circuit 56 which has an output a for transmission of a further signal which is indicative of the second diameter $D_2$ of the article 41 advancing beyond the measuring station 51.

It will be noted that the improved diameter ascertaining apparatus can determine two diameters $D_1$ and $D_2$ of each article 41 at one and the same measuring station 42 or at two different stations 42 and 51. However, irrespective of whether the diameter $D_2$ is monitored at 51 or at 42, the apparatus can be readily designed in such a way that the diameter $D_2$ is normal to the corresponding diameter $D_1$.

The outputs of the components 46, 56 and 79 of the evaluating circuit 44 are connected to the corresponding inputs of a further circuit 55 which serves as a means for forming corrected signals denoting averaged diameters of successive articles 41. Such corrected or averaged signals are transmitted to the display unit 48 and/or to the actuating unit 49 of the improved apparatus. The circuit 55 can compensate for departures of shapes of the measured articles 41 from optimal or desired shapes. Such compensation can involve compensation for factors which would entail a distortion of (second) signals denoting the diameters $D_1$ (as measured by the instrument 37) as well as for factors which would entail a distortion of (fourth or further) signals denoting the diameters $D_2$ (as monitored by the timer 73 or by the detector 52).

Figure 3:
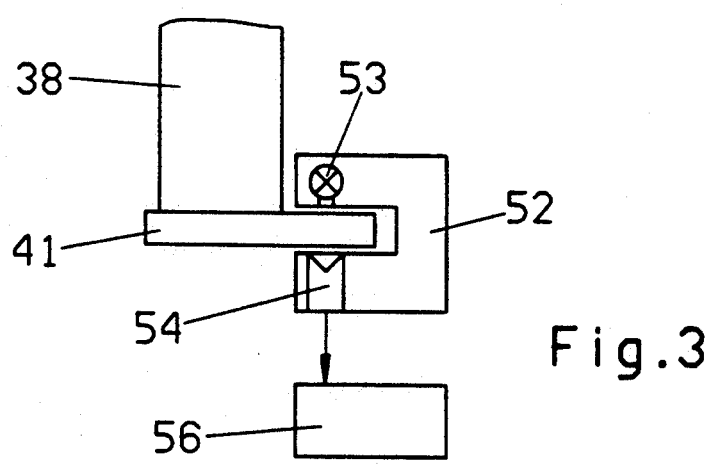
FIG. 3 shows a detail in the apparatus of FIG. 2, substantially as seen in the direction of arrow III.

FIG. 3 shows one presently preferred mode of installing the radiation source 53 and the transducer 54 of the optoelectronic detector 52 at the second measuring station 51. Thus, a portion of an article 41 which arrives at the station 51 extends beyond one axial end of the conveyor 38 so that it can pass through the gap between the source 53 and the transducer 54 whereby the article 41 intercepts the beam issuing from the source 53 and the transducer 54 transmits to the circuit 56 a signal for the duration of such interruption.

The operation of the apparatus of FIGS. 2 and 3 is as follows:

The first step involves rotation of the conveyor 38 about the axis of the shaft 47 while the flutes 39 are empty and while the instrument 37 is on so that the beam 43 of radiation issuing from the radiation source of the instrument 37 can be used to determine the reference distance AR, i.e., the distance of the bottom of a flute 39 from the reference point R. The memory of the evaluating circuit 44 stores a reference signal which is indicative of the distance AR.

The filter tipping machine is then set in operation so that the conveyor 38 (corresponding to the conveyor 6 of FIG. 2) transports a succession of articles 41 from the outlet of the magazine 4 toward the first disc-shaped rotary knife 7. As an article 41 advances through the first measuring station 42 (i.e., along the predetermined portion of the path for such articles with the conveyor 38), the instrument 37 determines the distance AM of such article from the reference point R. The arrangement is preferably such that the instrument 37 generates a set of successive signals as represented by the curve 71 in FIG. 2. Such curve is shown in the window 72 of the instrument 37, and a representative signal 70 of such set of signals is then transmitted via output a of the instrument 37 as a first signal which is converted into a second signal (denoting the diameter $D_1$) in the signal generating unit 46 of the evaluating circuit 44. The signal 70 is an extreme signal of the set of signals which are represented by the curve 71, and such signal 70 is most accurately representative of the minimal distance AM of the article 41 at the measuring station 42 from the reference point R. The coordinate system for the curve 71 has an ordinate A denoting the distance from the reference point R (the distances AM are measured along the ordinate) and an abscissa for indicating the number of distance measurements made by the instrument 37 while an article 41 advances through the measuring station 42.

For example, the evaluating circuit 44 can compare the memorized reference signal (distance AR) with the (second) signal which is transmitted by the output of the unit 46, and the difference of the two signals is indicative of the diameter $D_1$ of the measured article 41, i.e., of that article which is in the process of advancing beyond the measuring station 42.

If the articles 41 are statistically oriented in the flutes 39 with reference to their central longitudinal axes 45, i.e., if the articles 41 are not subject to preferred orientation relative to their axes 45, the average value of several successively determined diameters $D_1$ can be utilized as a highly accurate indicator of average diameters of the articles 41. For example, this is the case if the instrument 37 is installed at or close to the discharge end of the magazine 4 in a filter tipping machine, i.e., if the diameter ascertaining apparatus of the present invention is installed in a manner as shown in FIG. 1. However, if the articles are continuously transported without possibility of a change of orientation relative to their respective central longitudinal axes 45, such articles retain a preferred orientation which, in the event of deformation of articles, is likely to result in determination of misleading diameters, i.e., the measured values depart from the actual values. This is the reason that the apparatus is preferably designed to determine the diameter $D_1$ as well as the diameter $D_2$ of each article 41 and to thereupon process the signals denoting these diameters in order to obtain a corrected or averaged signal D which is more accurately representative of the actual diameter of the respective article. As already described above, the second diameter $D_2$ of each article 41 can be determined by the instrument 37 at the first measuring station 42. The presently preferred method involves determination of second diameters $D_2$ (which are normal to the respective first diameters $D_1$) at the first measuring station 42, i.e., by resorting to determination of the intensity I of radiation (beam 43) which is reflected by the wrappers of articles 41 at the measuring station 42. However, if such second measurement at the station 41 is impossible or impractical, the apparatus is provided with the detector 52 or (if already provided) such detector 52 is activated to determine the second diameters $D_2$ at the second measuring station 51 which may but need not necessarily be adjacent the path of articles 41 with the conveyor 38. Again, the diameters $D_2$ which are ascertained by resorting to the detector 52 are normal to the diameters $D_1$ of the respective articles 41. The signals which are transmitted by the output a of the transducer 54 to the input of the unit 56 are proportional to the duration of interruption of the beam from the radiation source 53 by the respective articles 41.

The computer 55 of the evaluating circuit 44 processes the signals denoting the diameters $D_1$ and $D_2$ of successive articles 41 into corrected or averaged signals which represent the averaged diameters D of the respective articles. This is preferably carried out by resorting to the equation $D=(D_1 \times D_2)^{\frac{1}{2}}$. The utilization of such relatively simple elliptic equation is possible because the ascertained diameters $D_1$ and $D_2$ of each article 41 are exactly normal to each other. Thus, the evaluating operation is simple and can be completed within an extremely short interval of time. In addition, the equation furnishes a diameter D which is accurately representative of the average diameter of the measured article.

The measurements which are carried out by the instrument 37 of FIG. 2 and are represented by the curve 71 constitute a set of immediately following consecutive measurements while an article 41 is in the process of advancing through the measuring station 42. However, it is equally within the purview of the invention to carry out a finite number of successive measurements at fixed intervals. Irrespective of the exact number of measurements of the distance AM of an article 41 at the station 42 from the reference point R, the selected or representative signal 70 is preferably the signal which is indicative of the shortest distance AM.

Analogously, the timer 73 of the instrument 37 need not continuously generate signals denoting the momentary intensities I of the beam 43. It is equally possible to measure the intensities of the beam 43 at certain intervals during advancement of an article 41 through the measuring station 42.

FIG. 2 shows that the illustrated evaluating circuit 44 comprises a number of discrete interconnected units including those shown at 46, 48, 49, 55, 56, 78 and 79. Such illustration in the form of a block diagram has been selected for the purposes of convenient description and better understanding of the steps which are carried out in accordance with the improved method. In actual practice, a diameter measuring apparatus which is used in a modern high-speed filter tipping, filter rod making, filter rod transporting or cigarette making or transporting machine constitutes a processor with integrated circuits or with a computer. Thus, the actual diameter ascertaining apparatus does not comprise a number of discrete circuits but the actually employed circuitry performs all of the aforedescribed steps with the same results as described above with reference to FIGS. 2 and 3.

Figure 4:
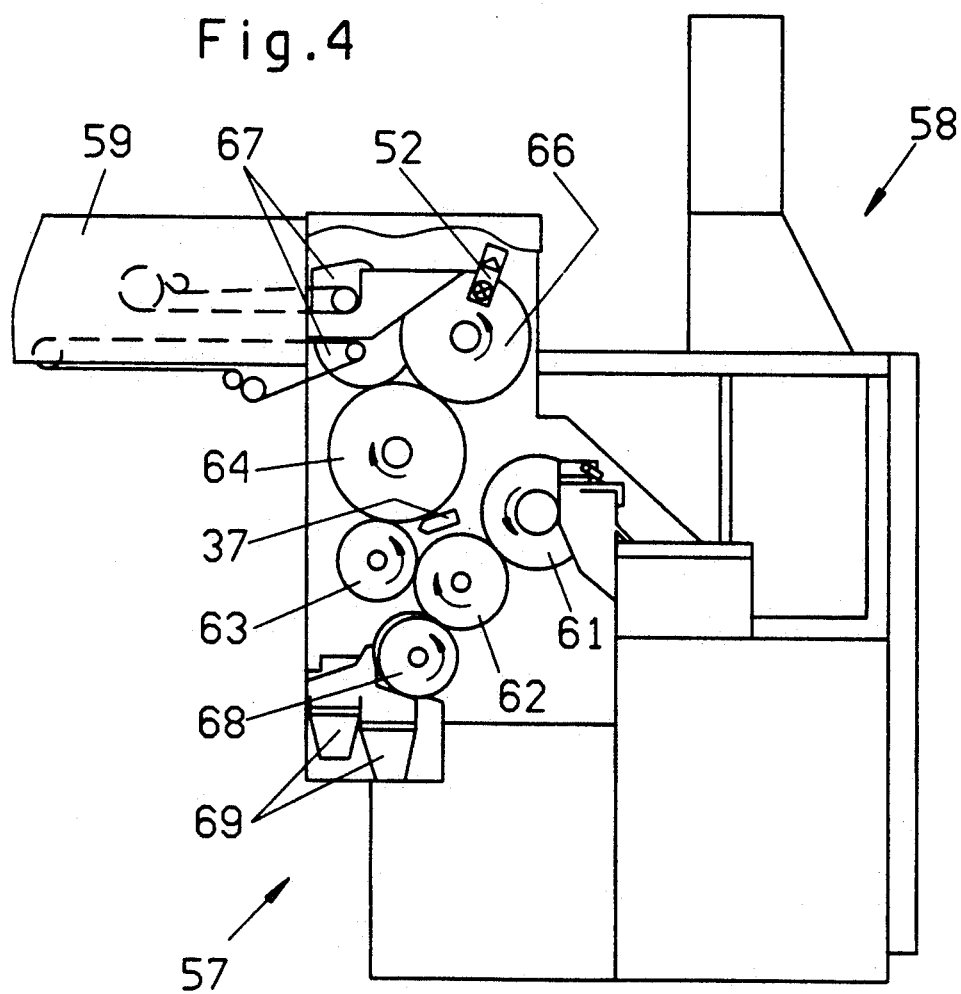
FIG. 4 is a schematic elevational view of a machine which serves to transport filter rod sections and is combined with a modified diameter ascertaining apparatus.

FIG. 4 illustrates the manner in which the diameter ascertaining apparatus of FIG. 2 or an analogous apparatus can be installed in a filter rod making machine 58 or in a machine 57 which transports filter rod sections (such as the articles 41) from a filter rod making machine 57 to the magazine 4 of the filter tipping machine shown in FIG. 1. The filter rod making machine 58 can be of the type known as KDF produced and distributed by the assignee of the present application. A similar machine is described and shown in commonly owned U.S. Pat. No. 3,974,007 granted Aug. 10, 1976 to Greve for "Method and apparatus for the production of filter rod sections or the like" to which reference may be had if necessary. The machine 57 serves to transport filter rod sections to a magazine 59, e.g., a magazine or reservoir known as RESY which is made and distributed by the assignee of the present application. Reference may be had to commonly owned U.S. Pat. No. 4,339,026 granted Jul. 13, 1982 to Bäse et al. for "Apparatus for delivering cigarettes or the like from a maker to a consuming machine".

The machine 58 produces a continuous filter rod which is repeatedly severed by a so-called cutoff to yield a file of coaxial filter rod sections (e.g., 41) of selected length. Successive sections of the filter rod enter successive axially parallel peripheral flutes of a rotary drum-shaped conveyor 61 which changes the direction of transport of the sections so that they are caused to move sideways (at right angles to their respective axes) and into successive flutes of a rotary drum-shaped intermediate conveyor 62. The latter delivers the sections into successive axially parallel peripheral flutes of a transfer conveyor 63 which, in turn, delivers the section into successive flutes of a rotary drum-shaped orienting conveyor 64 which cooperates with inclined discs (not specifically shown because known in the art) to move each section to a predetermined axial position. The thus oriented sections are transferred into successive axially parallel flutes of a rotary drum-shaped conveyor 66 which, in turn, delivers the sections between the endless belts 67 of the reservoir 59. The conveyor belts 67 are spaced apart from each other to define a first-in last-out storage space for a substantial number of filter rod sections. The filter rod sections remain in the reservoir 59 until needed in a filter tipping machine or for an interval of time which is necessary to cure the plasticizer which is customarily employed to bond portions of filamentary filter material in a filter rod section to each other.

Instead of delivering filter rod sections to the conveyor 63, the conveyor 62 can also deliver such sections to a drum-shaped conveyor 68 which deposits the thus received sections in a collecting receptacle 69.

The diameter ascertaining instrument or range finder 37 of the diameter measuring apparatus which is associated with the transporting machine 57 of FIG. 4 is adjacent the rotary drum-shaped transfer conveyor 63 (which performs the function of the conveyor 38 shown in FIG. 2). The photoelectronic detector 52 of the diameter ascertaining apparatus of FIG. 4 is adjacent the conveyor 66. Thus, the instrument 37 and the detector 52 need not be installed next to one and the same conveyor; all that counts is that they be properly positioned with reference to the path of movement of rod-shaped articles from the maker 58 to the reservoir 59. The diameters $D_1$ which are measured by the instrument 37 are normal to the diameters $D_2$ which are ascertained by the detector 52 because the articles which are being tested are held against uncontrolled angular movements about their respective central longitudinal axes 45 (FIG. 2) during movement with the conveyors 63, 64, 66 as well as during transfer from the conveyor 63 to conveyor 64 and from conveyor 64 to conveyor 66. This is desirable and advantageous for the aforediscussed reasons, i.e., it is normally simpler and more convenient to evaluate the signals denoting several different diameters of an article if the diameters are normal to each other.

An advantage of the improved method and apparatus is that an available instrument 37 can be utilized for simultaneous determination of two diameters $D_1$ and $D_2$ of each of a short or long series of rod-shaped articles (such as 41) with a high degree of accuracy and in such a way that one of the ascertained diameters is normal to the other diameter. The utilization of the reference point R as an aid in determining the diameters $D_1$ of successive rod-shaped articles is basically different from heretofore known proposals to ascertain the diameters of rod-shaped articles of the tobacco processing industry, and it is equally novel to employ the same instrument 37 to simultaneously ascertain or measure a second diameter at one and the same measuring station.

Another advantage of the improved method and apparatus is that the diameters of rod-shaped articles can be ascertained with a high degree of accuracy. Moreover, the diameters are ascertained while the articles move sideways (at right angles to their respective central longitudinal axes 45) which is desirable in most instances because this is the accustomed and most convenient manner of transporting rod-shaped articles of the tobacco processing industry in a cigarette rod making, filter rod making, filter tipping, transporting or other machine for the making and processing of filter rod sections, tobacco containing sections and/or filter cigarettes, cigars, cigarillos or cheroots.

A further advantage of the improved method and apparatus is that the evaluating circuit 44 is capable of furnishing signals denoting article diameters D which are not affected at all, or are affected very little, by accidental random fluctuations of the measured diameters $D_1$ and/or $D_2$. This is achieved by the provision of the circuit 55 which can form averaged or corrected signals denoting the averaged diameters D of rod-shaped articles which have advanced through the measuring station 42 or through the measuring stations 42 and 51. Furthermore, and as already mentioned above, the evaluating circuit 44 is equally capable of averaging a series of successive signals which denote the diameters $D_1$ or $D_2$ of a selected plurality of consecutively monitored articles 41 to thus obtain averaged signals denoting the average diameters of a selected number of consecutively monitored articles.

An additional important advantage of the improved method and apparatus is that they render it possible to accurately ascertain the average diameters of successive rod-shaped articles (such as 41) which leave a source (such as the magazine 4 in the filter tipping machine of FIG. 1) in random orientation with reference to their central longitudinal axes 45. If the signals denoting the diameters of articles leaving the magazine 4 in random orientation are averaged, the thus obtained information is truly representative of the average diameters of selected numbers of consecutively monitored articles 41.

Still another important advantage of the improved method and apparatus is that they render it possible to accurately determine the cross-sectional outlines of the monitored rod-shaped articles. This is due to the fact that the ascertained diameters $D_2$ are normal to the ascertained diameters $D_1$. Consequently, the evaluating circuit 44 can furnish information which indicates the extent to which the articles are deformed, e.g., out of round if the articles are supposed to be round.

Measurements of diameters of rod-shaped articles 41 which issue from the magazine 4 of the filter tipping machine of FIG. 1 ahead of the locus (assembly conveyor 3) where the subdivided portions or sections (filter plugs of double unit length) of the articles 41 are aligned with the respective pairs of plain cigarettes coming from the conveyor 1 of the cigarette rod making machine are desirable and advantageous because the delivery of filter plugs to the conveyor 3 can be interrupted if the measurements with the instrument 37 indicate that the diameters of the articles 41 are too large or too small for proper assembly with pairs of plain cigarettes. Remedial action can involve adjusting the filter rod making machine and/or adjusting the cigarette rod making machine. Irrespective of the nature of remedial action, the measurements with the instrument 37 render it possible to improve the quality of the ultimate products (e.g., filter cigarettes of unit length if the instrument 37 is used in a manner as described with reference to FIG. 1).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of ascertaining the diameters of normally substantially round rod-shaped articles of the tobacco processing industry, comprising the steps of advancing a succession of articles in a predetermined direction along a predetermined path and past a reference point which is adjacent a predetermined portion of said path and is spaced apart from each successive article advancing along said portion of said path; optically measuring the distance of each successive article in said portion of said path from said reference point and generating first signals denoting the respective measured distances, including directing a beam of radiation from a source into said portion of said path so that the beam impinges upon and is reflected by successive articles advancing along said portion of said path whereby the intensity of reflected beam is indicative of a second diameter of the beam-reflecting article; converting each first signal into a second signal denoting one diameter of the respective article; monitoring the intensity of the reflected beam upon impingement on successive articles and generating third signals denoting the respective intensities; and processing said third signals into fourth signals denoting the second diameters of the respective articles.

2. The method of claim 1, further comprising the step of averaging second signals pertaining to pluralities of successively measured articles to form corrected signals denoting the average one diameter of the respective pluralities of articles.

3. The method of claim 1, wherein said monitoring step further comprises determining the duration of impingement of the beam upon successive articles in said portion of said path and generating fifth signals denoting the respective durations, said processing step including transforming said third signals and the corresponding fifth signals into the respective fourth signals.

4. The method of claim 3, wherein said intensity varies at a first instant of entry of each article into and at a second instant of advancement of each article beyond said portion of said path, said determining step including measuring for each article the length of the interval between the respective first and second instants.

5. The method of claim 1, further comprising the step of forming corrected signals including averaging each second signal and the respective fourth signal.

6. The method of claim 5, wherein said step of forming corrected signals D includes averaging each second signal $D_1$ and the respective fourth signal $D_2$ in accordance with the equation $$D=(D_1\times D_2)^{\frac{1}{2}}.$$

7. A method of ascertaining the diameters of normally substantially round rod-shaped articles of the tobacco processing industry, comprising the steps of advancing a succession of articles in a predetermined direction along a predetermined path and past a reference point which is adjacent a predetermined portion of said path and is spaced apart from each successive article advancing along said portion of said path; optically measuring the distance of each successive article in said portion of said path from said reference point and generating first signals denoting the respective measured distances; converting each first signal into a second signal denoting one diameter of the respective article; monitoring the articles of said succession in a second portion of said path; and generating additional signals denoting additional diameters of the monitored articles.

8. The method of claim 7, wherein said advancing step comprises depositing the articles of said succession onto a mobile support and moving the support past and at a predetermined distance from said reference point.

9. The method of claim 8, further comprising the step of memorizing a reference signal denoting a reference distance, said converting step including relating each of said first signals to said memorized reference signal.

10. The method of claim 9, wherein said reference distance is said predetermined distance.

11. The method of claim 7 of ascertaining the diameters of elongated rod-shaped articles having longitudinally extending central axes, wherein said advancing step includes transporting each article of said succession along said portion of said path substantially at right angles to the respective central axis.

12. The method of claim 7, wherein said measuring step includes repeatedly measuring the distance of each article in said portion of said path from said reference point to form for each article a set of consecutive first signals having different magnitudes and including a representative first signal of extreme magnitude, said converting step including converting said representative first signals of extreme magnitude.

13. The method of claim 12, wherein said measuring step further comprises processing each set of consecutive first signals into an array of first signals and selecting said representative first signals from the respective arrays.

14. The method of claim 7, wherein said second portion is located downstream of said predetermined portion of said path.

15. The method of claim 7, wherein said monitoring step includes directing a beam of radiation from a source into said second portion of said path so that the beam impinges upon and is intercepted by successive articles advancing along said second portion of said path for intervals of time which are indicative of the diameters of the respective articles, measuring the duration of each of said intervals, and generating further signals denoting the measured durations of said intervals, said signal generating step including processing said further signals into said additional signals.

16. The method of claim 15, further comprising the step of forming corrected signals including averaging each second signal with the respective additional signal.

17. The method of claim 16, wherein said step of forming corrected signals D includes averaging each second signal with the respective additional signal in accordance with the equation $D=(D_1 \times D_2)^{\frac{1}{2}}$ wherein $D_1$ is a second signal and $D_2$ is the respective additional signal.

18. Apparatus for ascertaining the diameters of normally substantially round rod-shaped articles of the tobacco processing industry, comprising means for advancing a succession of articles in a predetermined direction along a predetermined path and past a reference point which is adjacent a predetermined portion of said path and is spaced apart from each successive article advancing along said portion of said path; means for optically measuring the distance of each successive article in said portion of said path from said reference point and for generating first signals denoting the respective measured distances, said measuring means comprising a range finder including a source of radiation and means for directing at least one beam of radiation from said source into said portion of said path so that the at least one beam impinges upon and is reflected by successive articles advancing along said portion of said path whereby the intensity of the reflected at least one beam is indicative of a second diameter of the beam-reflecting article; and means for converting said first signals into second signals each denoting one diameter of the respective article, said measuring means further comprising means for monitoring the intensity of the reflected at least one beam upon impingement on successive articles and for generating third signals denoting the respective intensities, said converting means including means for processing third signals into fourth signals denoting the second diameters of the respective articles.

19. The apparatus of claim 18, wherein said monitoring means includes means for determining the duration of impingement of the at least one beam upon successive articles in said portion of said path and for generating fifth signals denoting the respective durations, said processing means including means for processing said fifth signals and the corresponding third signals into the respective fourth signals.

20. The apparatus of claim 19, wherein said monitoring means includes means for repeatedly monitoring the intensity of said at least one beam during advancement of an article along said portion of said path and for generating for each article a set of consecutive third signals.

21. The apparatus of claim 20, wherein said intensity varies at a first instant of entry of each article into and at a second instant of advancement of each article beyond said portion of said path, said determining means including means for measuring for each article the length of the interval between the respective first and second instants.

22. The apparatus of claim 18, wherein said converting means further comprises means for forming corrected signals from said second signals and the respective fourth signals.

23. The apparatus of claim 22, wherein said forming means comprises means for averaging said second signals and the respective fourth signals in accordance with the equation $D=(D_1 \times D_2)^{\frac{1}{2}}$ wherein D is a corrected signal, $D_1$ is the corresponding second signal and $D_2$ is the respective fourth signal.

24. Apparatus for ascertaining the diameters of normally substantially round rod-shaped articles of the tobacco processing industry, comprising means for advancing a succession of articles in a predetermined direction along a predetermined path and past a reference point which is adjacent a predetermined portion of said path and is spaced apart from each successive article advancing along said portion of said path; means for optically measuring the distance of each successive article in said portion of said path from said reference point and for generating first signals denoting the respective measured distances; means for converting said first signals into second signals each denoting one diameter of the respective article; means for monitoring the articles in a second portion of said path and for generating additional signals denoting additional diameters of the monitored articles.

25. The apparatus of claim 24, wherein said converting means comprises a signal evaluating circuit.

26. The apparatus of claim 24, wherein said measuring means comprises a source of radiation and means for directing radiation from said source into said portion of said path.

27. The apparatus of claim 26, wherein said advancing means includes a mobile support for the articles of said succession and means for moving said support past and at a predetermined distance from said reference point.

28. The apparatus of claim 27, wherein said converting means includes a memory for a reference signal denoting a reference distance and means for relating each of said first signals to said reference signal.

29. The apparatus of claim 28, wherein said reference distance is said predetermined distance.

30. The apparatus of claim 28, wherein said means for relating includes means for determining the difference between said reference signal and said first signals.

31. The apparatus of claim 24, wherein said measuring means comprises a range finder.

32. The apparatus of claim 24, wherein said advancing means includes a mobile support for the articles of said succession and means for moving said support past and at a predetermined distance from said reference point, said measuring means comprising a source of radiation and means for directing at least one beam of radiation from said source into said portion of said path so that the at least one beam is reflected by an article in said portion of said path or by said support in the absence of an article in said portion of said path, said support having a radiation absorbing surface which confronts said source at said portion of said path.

33. The apparatus of claim 24, wherein said converting means comprises means for averaging second signals pertaining to pluralities of successively measured articles and for forming corrected signals denoting the average diameters of the respective pluralities of articles.

34. The apparatus of claim 24, wherein said second portion is located downstream of said predetermined portion of said path.

35. The apparatus of claim 24, wherein said monitoring means comprises means for directing at least one beam of radiation from a source into said second portion of said path so that the at least one beam impinges upon and is intercepted by successive articles advancing along said second portion of said path for intervals of time which are indicative of the diameters of the respective articles, means for measuring the duration of each of said intervals, and means for generating further signals denoting the measured durations of said intervals, said signal generating means comprising means for processing said further signals into said additional signals.

36. The apparatus of claim 35, wherein said converting means further comprises means for forming corrected signals from said second signals and the respective additional signals.

37. The apparatus of claim 36, wherein said forming means comprises means for averaging said second signals and the respective additional signals in accordance with the equation $D=(D_1 \times D_2)^{\frac{1}{2}}$ wherein D is a corrected signal, $D_1$ is a corresponding second signal and $D_2$ is the respective additional signal.

38. The apparatus of claim 24, wherein said advancing means includes a conveyor which transports articles in the form of filter rod sections from a magazine of a filter tipping machine to means for uniting filter rod sections with tobacco rod sections.

* * * * *